(12) United States Patent
Cypher (10) Patent No.: US 8,621,156 B1
(45) Date of Patent: Dec. 31, 2013

(54) LABELED CACHE SYSTEM

(75) Inventor: Robert Cypher, Saratoga, CA (US)

(73) Assignee: Google Inc., Mountain View, CA (US)

( * ) Notice: Subject to any disclaimer, the term of this patent is extended or adjusted under 35 U.S.C. 154(b) by 112 days.

(21) Appl. No.: 13/416,109

(22) Filed: Mar. 9, 2012

(51) Int. Cl.
*G06F 12/00* (2006.01)

(52) U.S. Cl.
USPC ............................................. 711/133

(58) Field of Classification Search
None
See application file for complete search history.

(56) References Cited

U.S. PATENT DOCUMENTS

| | | | |
|---|---|---|---|
| 4,802,086 A | 1/1989 | Gay et al. | |
| 6,996,676 B2 | 2/2006 | Megiddo et al. | |
| 7,058,766 B2 | 6/2006 | Modha | |
| 7,096,321 B2 | 8/2006 | Modha | |
| 7,167,953 B2 | 1/2007 | Megiddo et al. | |
| 7,310,707 B2 | 12/2007 | Olds et al. | |
| 7,469,320 B2 | 12/2008 | Bonwick et al. | |
| 7,526,614 B2 | 4/2009 | van Riel | |
| 7,966,442 B1 * | 6/2011 | Panwar et al. | 711/3 |
| 2004/0123065 A1 * | 6/2004 | Garthwaite | 711/173 |
| 2010/0199042 A1 * | 8/2010 | Bates et al. | 711/114 |
| 2011/0197028 A1 * | 8/2011 | Nikara et al. | 711/118 |

* cited by examiner

*Primary Examiner* — Brian Peugh
(74) *Attorney, Agent, or Firm* — Fish & Richardson P.C.

(57) ABSTRACT

Methods, systems, and apparatus, including computer programs encoded on a computer storage medium, for labeled caching techniques. In one aspect, a method includes placing a plurality of items into a cache, each item having a label based on metadata associated with the item. A number of accesses are performed to respective items in the cache. A per-label stack distance histogram is determined for each label, including, for each label, determining a plurality of stack distances for accesses to items having the label. The cache is adjusted using the per-label stack distance histograms.

30 Claims, 5 Drawing Sheets

LABELED CACHE SYSTEM

BACKGROUND

This specification relates to digital data processing and, in particular, to caching techniques.

Various conventional techniques exist for cache allocation and replacement. For example, replacement techniques include Least-Recently Used (LRU), pseudo-LRU, First-in First-out (FIFO), and randomly replacing items. Typically, cache allocation and replacement techniques use information about the accesses to the cache to determine which items to leave in the cache and which items to replace. Some conventional systems allow the user of the cache to specify that certain items should not be placed in the cache, or that certain items need not stay in the cache for very long.

SUMMARY

A cache system uses metadata associated with items in the cache to improve the cache allocation and replacement strategy. Each item in the cache has a label based on the metadata. The metadata can be present in the system specifically for use in cache allocation and replacement or for other reasons. The cache system considers items with the same label as a sub-cache and then determines stack distance histograms for accesses to the sub-caches. The cache system uses the stack distance histograms to adjust the cache, e.g., the amount of storage allocated for each sub-cache.

In general, one innovative aspect of the subject matter described in this specification can be embodied in methods that include the actions of placing a plurality of items into a cache, each item having a label based on metadata associated with the item; performing a number of accesses to respective items in the cache; determining a per-label stack distance histogram for each label, including, for each label, determining a plurality of stack distances for accesses to items having the label; and adjusting the cache using the per-label stack distance histograms. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. Performing the accesses comprises: receiving a request for a first item; determining that the first item is not in the cache; determining a first label for the first item using first metadata associated with the first item; selecting a second item that is in the cache and has the first label; and replacing the second item with the first item. Determining a per-label stack distance histogram for a label includes, for a current access to a first item having the label, identifying a window of accesses between the current access to the first item and a most recent access to the first item prior to the current access to the first item, and determining the number of accesses to unique items with the label within the window of accesses. Determining the number of accesses to unique items with the label within the window of accesses comprises estimating the number of accesses by sampling items within the window. Adjusting the cache using the per-label stack distance histograms includes: selecting a plurality of possible cache allocations, and for each possible cache allocation, determining an overall miss rate for the possible cache allocation using the per-label stack distance histograms, each possible cache allocation being a division of cache storage according to a plurality of labels; determining that a first cache allocation of the possible cache allocations has the lowest overall miss rate of the possible cache allocations; and adjusting the cache to the first allocation having the lowest overall miss rate. Determining an overall miss rate for a possible cache allocation includes determining a miss rate for each label given the possible cache allocation using the per-label stack distance histograms. Determining a miss rate for a label includes: identifying an amount of space of cache storage allocated to the label; and using a per-label stack distance histogram for the label, determining the number of accesses to items having the label with a stack distance greater than or equal to the amount of space. Adjusting the cache using the per-label stack distance histograms includes: initializing a cache allocation of cache storage so that each label is not allocated any space in cache storage; using the per-label stack distance histograms, determining a marginal miss rate decrease for allocating a given amount of space in cache storage to each of a plurality of labels; and determining a first label having the greatest marginal miss rate decrease and allocating the given amount of space to items having the first label. The actions further include incrementally allocating space using determined marginal miss rate decreases until all of the cache storage is allocated. The metadata associated with the item does not specify a cache allocation technique.

Particular embodiments of the subject matter described in this specification can be implemented so as to realize one or more of the following advantages. A cache system can have better performance (e.g., higher hit rate for the same amount of storage, or smaller amount of storage for the same hit rate) than conventional cache systems. The cache system performance can be improved without placing an additional burden on the user (e.g., the user is not required to explicitly specify cache allocation and replacement information.) The cache system can change its allocation and replacement strategy over time without intervention, e.g., from a programmer.

The details of one or more embodiments of the subject matter described in this specification are set forth in the accompanying drawings and the description below. Other features, aspects, and advantages of the subject matter will become apparent from the description, the drawings, and the claims.

DETAILED DESCRIPTION

Figure 1:
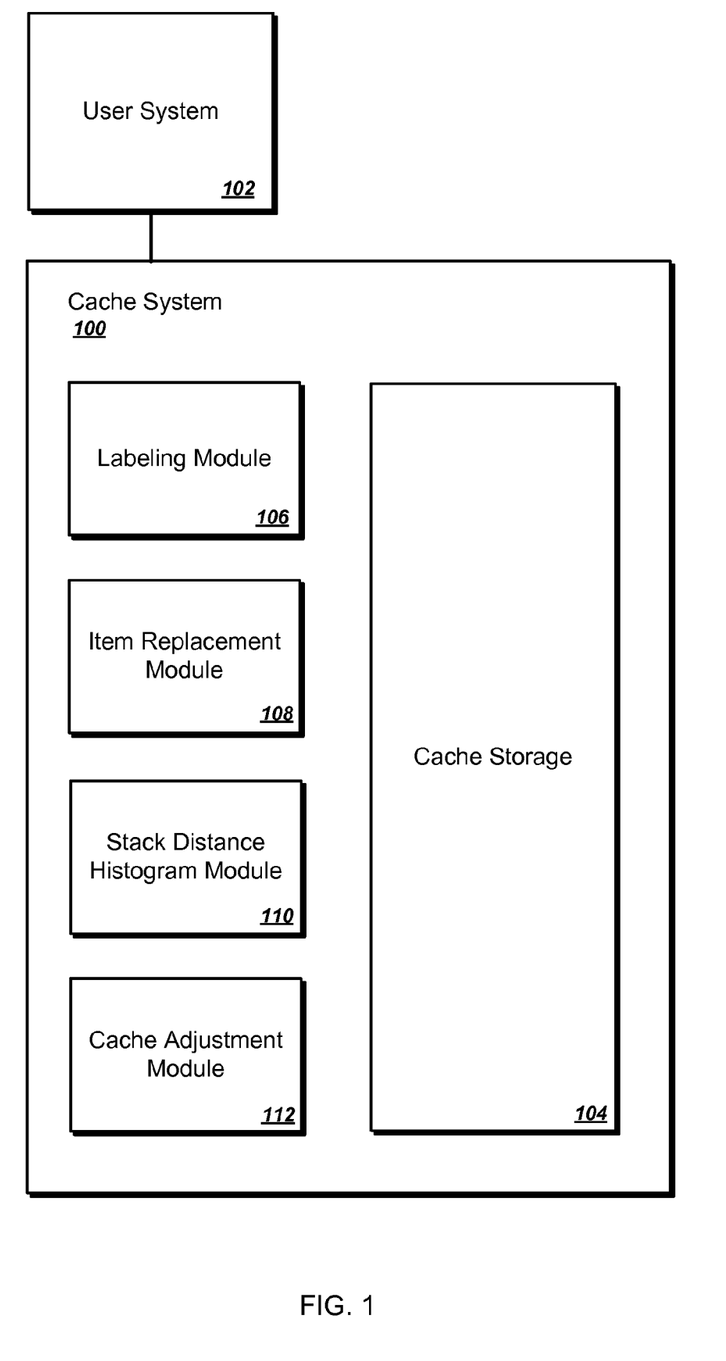
FIG. 1 is a block diagram of an example cache system that uses metadata associated with items stored in the cache to adjust the cache allocation and/or replacement strategy.

FIG. 1 is a block diagram of an example cache system 100 that uses metadata associated with items stored in the cache 100 to adjust the cache allocation and/or replacement strategy. A user system 102 stores items in the cache 100 and accesses items stored in the cache 100.

The cache system 100 includes cache storage 104 and one or more data processing apparatus configured to execute various modules 106-112. The cache system 100 can be, for example, a hardware cache or a software cache. The user system 102 includes one or more data processing apparatus configured to store items in the cache 100 and access items stored in the cache 100. An item is a chunk of digital data, e.g., a file or a portion of a file.

For example, the user system 102 can be a computer system on a computer network, and the cache system 100 can be a local storage system where items are stored to reduce the amount of traffic on the network. In another example, the user system 102 can be a processor that stores data from a hard drive on the cache system 100 which can have Random Access Memory (RAM) as the cache storage 104.

The labeling module 106 identifies or determines labels for items stored in the cache 100. The labels are based on metadata associated with the items or the contents of the items. The metadata can be provided by the user system 102 or determined by the labeling module 106. If the metadata is provided by the user system 102 for each item for purposes not related to caching, then the cache system 100 can use the metadata to improve cache performance without placing any additional burden on the user system 102. For example, where the item is a file, the metadata can be: a file type (e.g., text, audio, spreadsheet); a user identifier for a user who created the file; the size of the file; the size of a record for the file; a number of links to the file (e.g., on the Internet as determined by a web crawler); a directory or resource locator specifying a location of the file; and if the file was created by a compaction operation for a database or similar system, the type of compaction that created the file.

A label can be, for example, one or more of: strings, integers, or fingerprint values created by hashing one or more properties of the item. If different items have different sizes, and if the size of an item is fixed or does not tend to vary quickly, then the labeling module 106 can determine labels for items based on a bucketization of their sizes. For example, the labeling module 106 can determine that the label of an item of size x is floor(log 2(x)).

The cache system 100 operates as though items with identical labels are more likely to have similar caching needs than items with different labels. The cache system 100 considers items having the same label as a sub-cache. Each sub-cache, which is a collection of items having the same label, can have a different amount of space in the cache storage 104 allocated to the sub-cache. For example, if items having a certain label are accessed more frequently by the user system 102 than items having other labels, then the cache system 100 can allocate more space in the cache storage 104 for the sub-cache for items having that certain label than for other sub-caches. The cache system 100 uses the stack distance histogram module 110 and the cache adjustment module 112, discussed further below, to allocate space to sub-caches. The sub-caches are typically logical in nature, so items in a sub-cache do not need to be stored contiguously.

The item replacement module 108 determines which items in the cache to remove when the cache storage 104 is full and new items are added. The item replacement module 108 can use any of various replacement techniques (e.g., LRU, pseudo-LRU, random.) The item replacement module 108 can store information regarding accesses as needed for replacement techniques, for example, least-recently used data.

In general, when the user system 102 attempts to access a requested item from the cache 100 and the requested item is not in the cache 100, the item replacement module 108 determines zero, one, or more than one items to remove from the cache and replaces any removed items with the requested item. The user system 102 provides the requested item, which can be from another data source, e.g., a computer system on a network.

The item replacement module 108 replaces items on a per-label basis. When the item replacement module 108 stores a new item by removing an old item, the item replacement module 108 removes an old item having the same label as the new item. Thus, the item replacement module 108 views items having the same label as a sub-cache, and uses a replacement technique on each sub-cache.

The stack distance histogram module 110 determines stack distance histograms on a per-label basis for items in the cache 100. The stack distance histogram module 110 can determine precise stack distances for accesses to the cache 100 or the stack distance histogram module 110 can determine estimates of stack distances for accesses to the cache 100. For example, the stack distance histogram module 110 can determine estimates of stack distances for accesses to the cache by randomly sampling records.

Figure 2A:
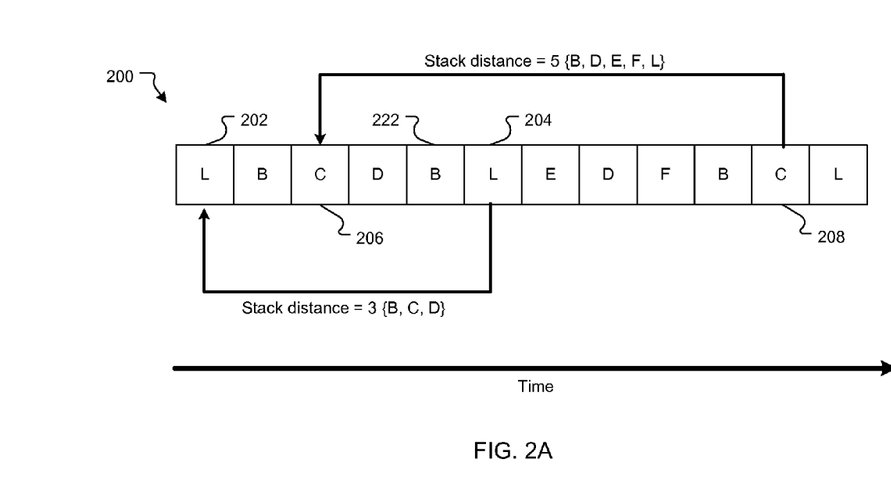
FIG. 2A is a schematic diagram of an example series of cache accesses. Each access is illustrated as a box marked by a letter.
Figure 2B:
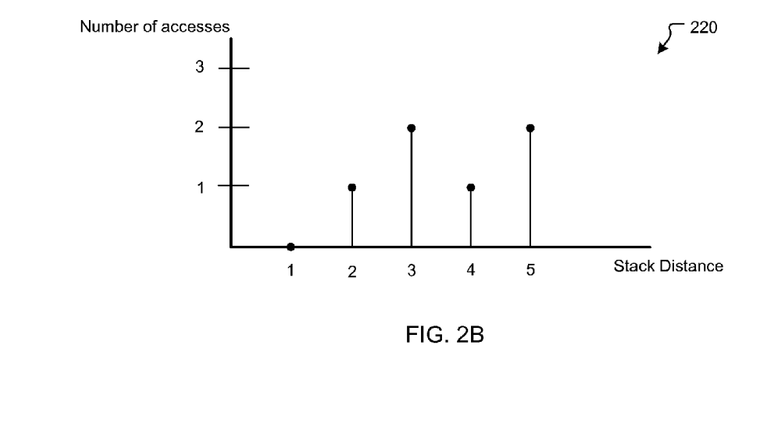
FIG. 2B is a graphical representation of an example stack distance histogram for the example series of cache accesses.

Stack distances and stack distance histograms are discussed further with reference to FIGS. 2A and 2B. The stack distance histogram module 110 determines or estimates stack distances for accesses to items having the same label, where only intervening accesses to the same label are considered in the determination of the stack distance. For a current access to an item with label i, the window from the current access to the most recent access to the same item is examined and the number of distinct items with label i that were accessed in this window is the stack distance for that current access. When the items have different sizes, the stack distance histogram module 110 can determine that the stack distance of an access to an item with a given label includes the total sizes (rather than just the number) of distinct items with the same label since the last access to the same item.

The stack distance histogram module 110 can periodically determine new stack distance histograms. The stack distance histogram module 110 can double-buffer the stack distance histograms, so that one stack distance histogram is being used (e.g., by the cache adjustment module 112) while the stack distance histogram module 110 is determining a new stack distance histogram.

The cache adjustment module 112 adjusts the cache 100 based on the stack distance histograms determined by the stack distance histogram module 110. The cache adjustment module 112 adjusts, for example, the allocation of cache storage 104 to sub-caches. The cache can be adjusted in various ways to increase its performance. Adjusting the cache 100 is described further below with reference to FIG. 4.

The cache adjustment module 112 typically adjusts the allocation of the cache storage 104 between labels to reduce the overall miss rate of the cache 100. The cache adjustment module 112 can also adjust the cache 100 to optimize other metrics in addition to or instead of the overall miss rate. For example, if there is a cost metric associated with a cache miss for each possible label (e.g., assigned automatically based on observed latency for satisfying the miss, or by the user system 102), then that cost metric can be included in adjusting the cache. As another example, a cost metric can be associated with placing an item in the cache (e.g., to help capture the cost of writing to a flash-based cache that has a limited number of program-erase cycles.)

In some implementations, the cache system 100 has access to multiple types of metadata values, possibly including sizes of items as discussed above. The cache system 100 can adjust the cache based on which type of metadata, or combination of types of metadata, is used for the label. The cache system 100 can select various types and combinations of metadata to use as the label and either estimate or observe the resulting miss rate for the cache 100. The cache system 100 can then select the type of metadata that provides the lowest miss rate (e.g., for recent accesses to the cache 100) to use for the labels.

In some implementations, the cache system 100 combines multiple labels, e.g. by hashing the labels to a small number of possible values. This is useful, for example, where there are a large number of labels and adjusting the cache heavily uses computing resources (e.g., takes too much processor time or uses too much memory.) In some implementations, the cache system 100 determines (by calculating or estimate, e.g., using a counting Bloom filter) a number of the most common labels and maintains stack distance histograms for each of those labels, while grouping the remaining labels under a common label.

FIG. 2A is a schematic diagram of an example series 200 of cache accesses. Each access is illustrated as a box marked by a letter. The letter indicates an address for the access. The addresses are of an appropriate granularity (e.g., page addresses, cacheline addresses.) The accesses are time ordered from left to right.

The stack distance of a given access A is determined by finding the last access A' before the given access A having the same address and counting the number of unique accesses between the given access A and the last access A'. For example, consider the first and second accesses 202 and 204 to address L. There are four total accesses between the first and second accesses 202 and 204 (B, C, D, and B), and there are three unique accesses (B, C, and D.) So the stack distance of the second access 204 is three. For another example, consider the first and second accesses 206 and 208 to address C. There are seven total accesses between the first and second accesses 206 and 208 (D, B, L, E, D, F, and B), and there are five unique accesses (B, D, E, F, L.) So the stack distance of the second access 208 is five. For a cache system using labels (e.g., the cache system 100 of FIG. 1), stack distances can be determined on a per-label basis, as described above with reference to FIG. 1.

FIG. 2B is a graphical representation of an example stack distance histogram 220 for the example series 200 of cache accesses. Stack distances are on the horizontal axis and the number of accesses having each stack distance are on the vertical axis. For example, consider the stack distance two. The stack distance histogram 220 indicates that, for the stack distance two, there was one access having that stack distance. The access is the second access 222 from the example series 200 to the address B. Generating a stack distance histogram does not require creating a graphical representation of the stack distance histogram.

Figure 3:
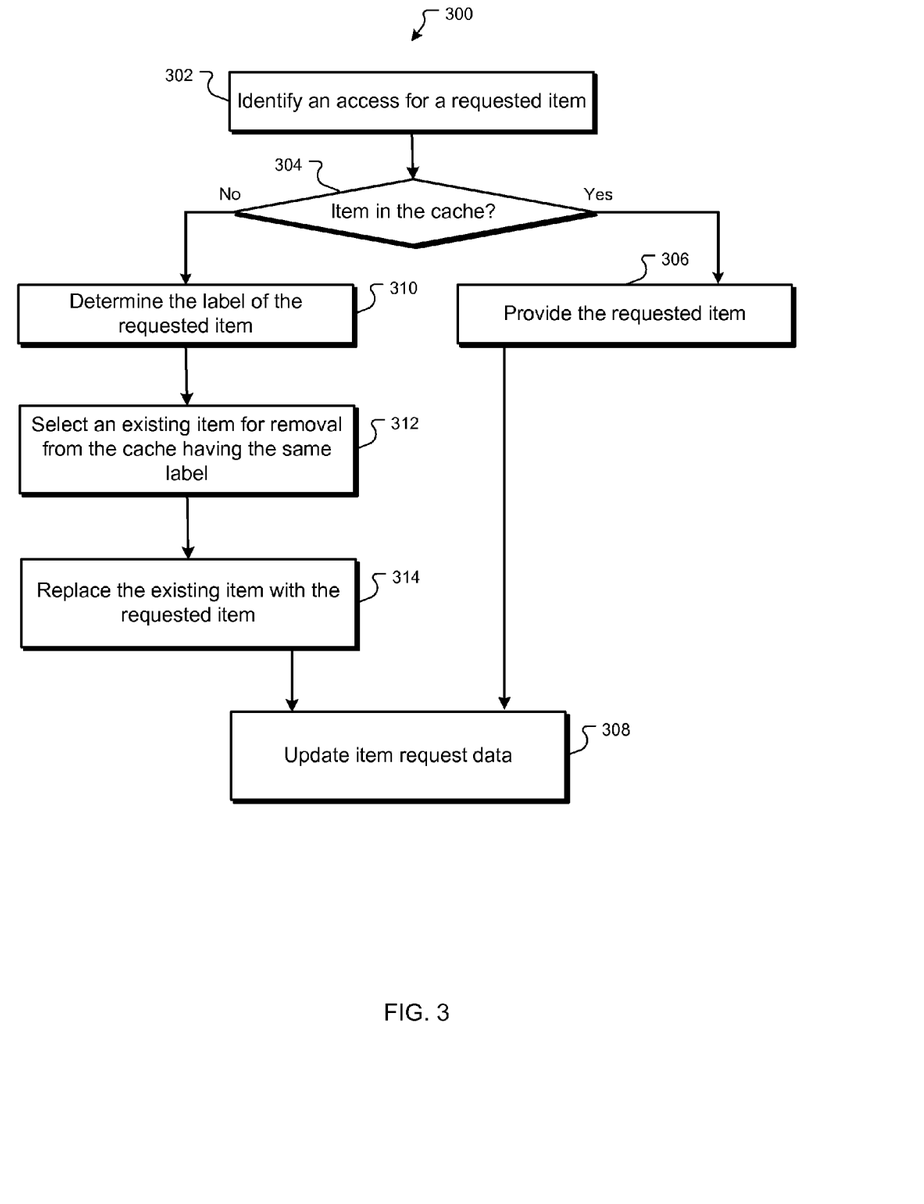
FIG. 3 is a flow diagram of an example process for accessing items in a cache when the cache is full.

FIG. 3 is a flow diagram of an example process 300 for accessing items in a cache when the cache is full (e.g., the cache system 100 of FIG. 1.) For purposes of illustration, the process 300 will be described with respect to a system that performs the process 300. The process 300 can be performed by a system of one or more computers.

The system identifies an access for a requested item (302). For example, the system can receive a request for an access to the requested item from a user system, e.g., the user system 102 of FIG. 1. The user system 102 provides information specifying the requested item, e.g., an address in the cache, an identifier of the item, or both.

The system determines whether the requested item is in the cache (304). For example, if a requesting user system provides an address for the requested item, the cache reads the provided address to determine whether the item is actually stored there.

If the requested item is in the cache, the system provides the requested item (306). For example, the system can provide the item to a requesting user system. The system updates item request data (308). Item request data can be, for example, data used by the item replacement module 108 of FIG. 1, e.g., least-recently-used statistics. The system can, but need not, update stack distance histograms, e.g., as described further below with reference to stage 402 of FIG. 4.

If the requested item is not in the cache, the system determines the label of the requested item (310). For example, if the cache uses certain metadata associated with each item as the label, then the cache identifies that metadata for the requested item. In another example, if the cache uses a hash of certain metadata associated with each item as the label, then the system hashes that metadata for the requested item to determine the label for the requested item.

The system selects one or more existing items for removal from the cache having the same label as the requested item (312). For example, the system selects the one or more existing items using a per-label replacement technique as described above with reference to FIG. 1. The system replaces the one or more existing items with the requested item (314). The system receives the requested item, for example, from a requesting user system, which obtains the item from a source other than the cache. The system updates item request data (308).

Figure 4:
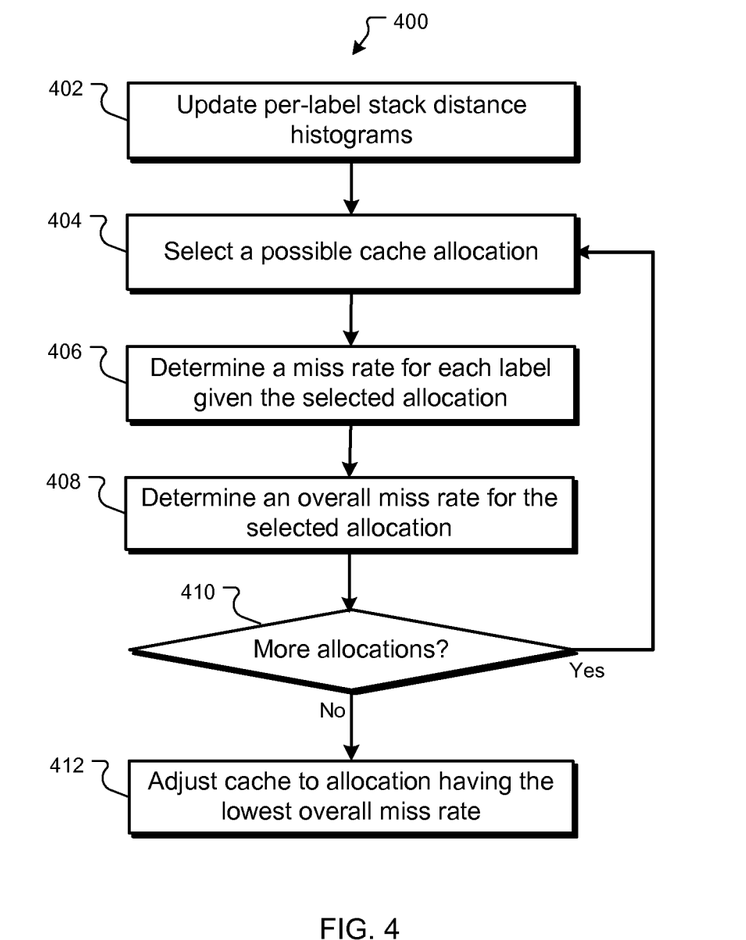
FIG. 4 is a flow diagram of an example process for adjusting a cache using labels for items in the cache.

FIG. 4 is a flow diagram of an example process 400 for adjusting a cache using labels for items in the cache (e.g., the cache system 100 of FIG. 1.) The process 400 can be performed by a system of one or more computers. For purposes of illustration, the process 400 will be described with respect to a system that performs the process 400.

The system updates per-label stack distance histograms (402). The system can update the stack distance histograms periodically, or in response to a trigger (e.g., a request from a user system.) Determining per-label stack distance histograms is discussed further above with reference to FIG. 1 and FIGS. 2A and 2B.

The system selects a possible cache allocation (404). A cache allocation is a division of the cache's storage according to labels, specifying for any given label an amount of storage space. For example, the system can select a cache allocation that divides the cache's storage equally among the labels, or the system can select a cache allocation that divides the cache's storage according to the number of items for each label currently in the cache. As the process 400 iterates, the system can systematically select various possible cache allocations by increasing some label's allocated space at the expense of another label's allocated space. For example, if the cache has size S and if there are L distinct possible labels, denoted 0 . . . L-1, then all possible partitions of S into sub-sizes $S\_0 \ldots S\_(L-1)=S$ can be selected.

The system determines a per-label miss rate for each label given the selected allocation (406). The system uses the stack distance histograms to determine the per-label miss rates, which are estimates of the actual miss rates. For example, suppose that for the selected allocation, a given label i has a sub-size S_i allocated to it and the stack distance histogram for label i indicates that there were M_i accesses to items with label i with a stack distance greater than or equal to S_i. The system can determine that the miss rate for label i for the selected allocation is equal to M_i (or a number based on M_i, e.g., M_i divided by an amount of time or number of accesses used in creating the stack distance histograms.)

The system determines an overall miss rate for the selected allocation using the per-label miss rates (408). For example, the system can determine that the overall miss rate for the selected allocation is the sum of the miss rates for all of the labels determined in stage 406.

The system determines whether there are more allocations (410). In general, the system determines that there are more allocations until an end condition is reached. The end condition can be, for example, that there are no more possible allocations, or that a time limit has been reached, or that a threshold number of allocations have been selected. If there are more allocations, the system selects another allocation (return to 404).

If there are no more allocations, the system adjusts the cache to the allocation having the lowest overall miss rate (412). If the allocation is changed from a previous allocation, then the system can start storing items according to the new allocation without having to immediately replace any items. For example, consider first and second labels, where the first label's allocation has been reduced and the second label's allocation has been increased. The system need not immediately discard items having the first label; instead, when the system stores a new item having the second label, an old item having the first label can be replaced by the new item.

Figure 5:
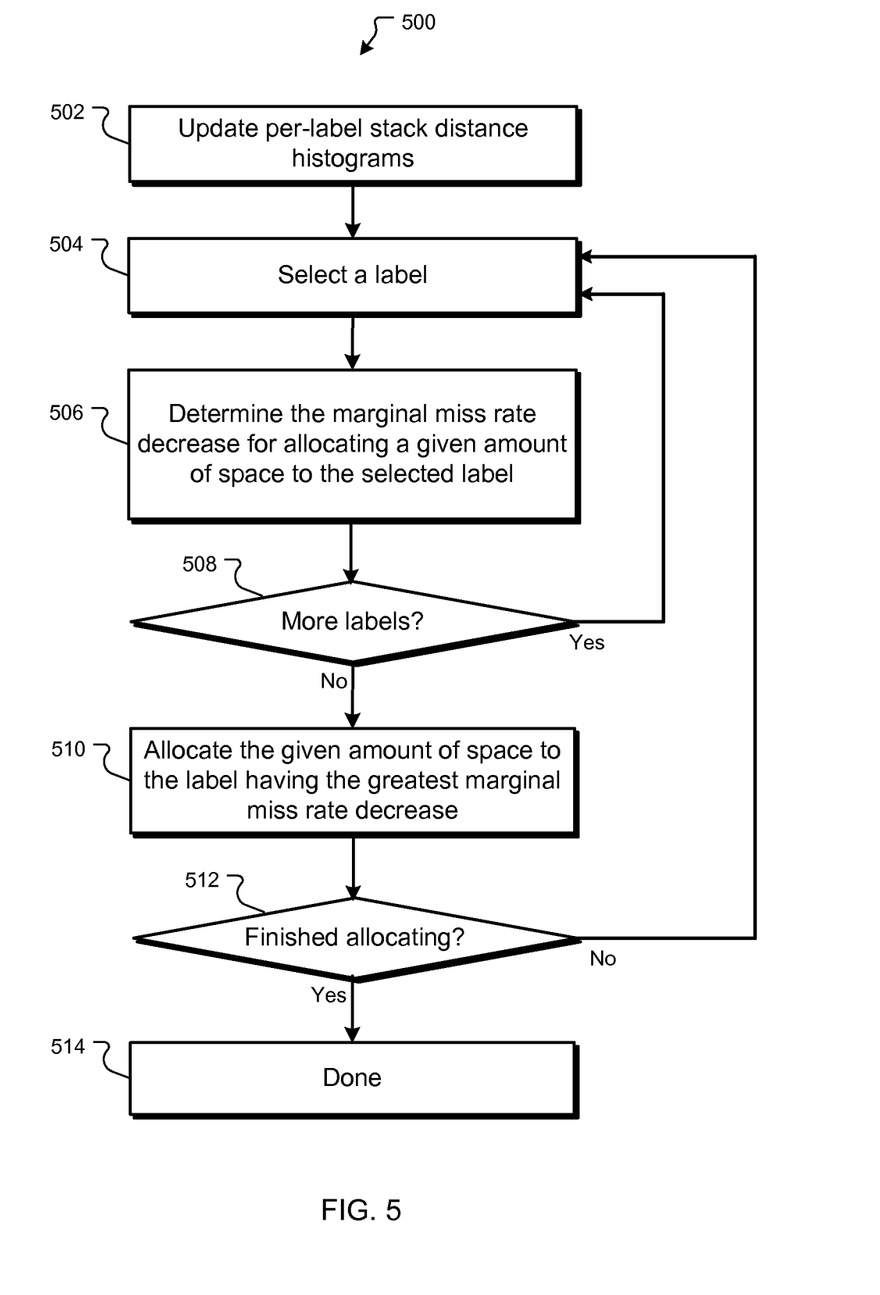
FIG. 5 is a flow diagram of a different example process for adjusting a cache using labels for items in the cache.

FIG. 5 is a flow diagram of a different example process 500 for adjusting a cache using labels for items in the cache (e.g., the cache system 100 of FIG. 1.) For purposes of illustration, the process 500 will be described with respect to a system that performs the process 500. The process 500 can be performed by a system of one or more computers.

In general, the system performs the process by starting with no space allocated to any label and then determining the marginal miss rate decrease from allocating a given amount of space to each label. Whichever label has the greatest decrease in miss rate for a given increase in size is allocated the given amount of space. The system iterates allocating given amounts of space until the available storage space has been allocated to various labels.

The system updates per-label stack distance histograms for the cache (502). The system can update the stack distance histograms periodically or in response to a trigger (e.g., a request from a user system.) Determining per-label stack distance histograms is discussed further above with reference to FIG. 1 and FIGS. 2A and 2B.

The system selects a label (504). The system can select labels in any order, e.g., in ascending, descending, or alphabetical order.

The system determines the marginal miss rate decrease for allocating a given amount of space to the selected label (506). The system starts with having no space allocated to any label. As the process iterates, the allocation of the cache changes, being allocated in various amounts to different labels.

To determine the marginal miss rate decrease, the system determines an old miss rate and a new miss rate. The old miss rate is the miss rate for the selected label using a current allocation. The new miss rate is the miss rate for the selected label using a possible new allocation, where the possible new allocation is the same as the current allocation except that the given amount of space is allocated to the selected label. Because the system starts with having no space allocated to any label, the given amount of space will not be allocated until the system finishes allocating space in stage 512. The miss rates are determined using the stack distance histograms, e.g., as described above with reference to stage 406 of FIG. 4. The system subtracts the new miss rate from the old miss rate to determine the marginal miss rate decrease.

The given amount of space can be specified based on various factors, e.g., the average size of items in the cache, the total amount of storage in the cache, and so on. If the given amount of space is larger, the process 500 will take less time to complete, but can yield a less optimized allocation (e.g., having a higher miss rate.) If the given amount of space is smaller, the process 500 will take more time to complete, but can yield a more optimized allocation (e.g., having a lower miss rate.)

The system determines whether there are more labels (508). The system selects labels until an end condition is reached, e.g., all the labels have been selected. The system need not select every possible label. For example, several labels having small numbers of items can be grouped under a single label. If there are more labels, the system selects another label (return to 504). The system allocates the given amount of space to the label having the greatest marginal miss rate decrease (510).

The system determines whether it is finished allocating space (512). In general, the system continues to allocate space until the available cache storage space has all been allocated to labels. If the system has not finished allocating, then the system selects another label (return to 504). The determinations of the marginal miss rate can be different, however, because even if the given amount of space to be allocated is the same size, the current allocation changes as the process allocates space to labels. If the system has finished allocating, then the process terminates (514).

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by data processing apparatus, the method comprising:
    placing a plurality of items into a cache, each item having a label based on metadata associated with the item;
    performing a number of accesses to respective items in the cache;
    determining a per-label stack distance histogram for each label, including, for each label, determining a plurality of stack distances for accesses to items having the label; and
    adjusting the cache using the per-label stack distance histograms.

2. The method of claim 1, wherein performing the accesses comprises:
    receiving a request for a first item;
    determining that the first item is not in the cache;
    determining a first label for the first item using first metadata associated with the first item;
    selecting a second item that is in the cache and has the first label; and
    replacing the second item with the first item.

3. The method of claim 1, wherein determining a per-label stack distance histogram for a label includes, for a current access to a first item having the label, identifying a window of accesses between the current access to the first item and a most recent access to the first item prior to the current access to the first item, and determining the number of accesses to unique items with the label within the window of accesses.

4. The method of claim 3, wherein determining the number of accesses to unique items with the label within the window of accesses comprises estimating the number of accesses by sampling items within the window.

5. The method of claim 1, wherein adjusting the cache using the per-label stack distance histograms includes:
    selecting a plurality of possible cache allocations, and for each possible cache allocation, determining an overall miss rate for the possible cache allocation using the per-label stack distance histograms, each possible cache allocation being a division of cache storage according to a plurality of labels;
    determining that a first cache allocation of the possible cache allocations has the lowest overall miss rate of the possible cache allocations; and
    adjusting the cache to the first allocation having the lowest overall miss rate.

6. The method of claim 5, wherein determining an overall miss rate for a possible cache allocation includes determining a miss rate for each label given the possible cache allocation using the per-label stack distance histograms.

7. The method of claim 6, wherein determining a miss rate for a label includes:
    identifying an amount of space of cache storage allocated to the label; and
    using a per-label stack distance histogram for the label, determining the number of accesses to items having the label with a stack distance greater than or equal to the amount of space.

8. The method of claim 1, wherein adjusting the cache using the per-label stack distance histograms includes:
    initializing a cache allocation of cache storage so that each label is not allocated any space in cache storage;
    using the per-label stack distance histograms, determining a marginal miss rate decrease for allocating a given amount of space in cache storage to each of a plurality of labels; and
    determining a first label having the greatest marginal miss rate decrease and allocating the given amount of space to items having the first label.

9. The method of claim 8, further comprising incrementally allocating space using determined marginal miss rate decreases until all of the cache storage is allocated.

10. The method of claim 1, wherein the metadata associated with the item does not specify a cache allocation technique.

11. A system of one or more computers configured to perform operations comprising:
    placing a plurality of items into a cache, each item having a label based on metadata associated with the item;
    performing a number of accesses to respective items in the cache;
    determining a per-label stack distance histogram for each label, including, for each label, determining a plurality of stack distances for accesses to items having the label; and
    adjusting the cache using the per-label stack distance histograms.

12. The system of claim 11, wherein performing the accesses comprises:
    receiving a request for a first item;
    determining that the first item is not in the cache;
    determining a first label for the first item using first metadata associated with the first item;
    selecting a second item that is in the cache and has the first label; and
    replacing the second item with the first item.

13. The system of claim 11, wherein determining a per-label stack distance histogram for a label includes, for a current access to a first item having the label, identifying a window of accesses between the current access to the first item and a most recent access to the first item prior to the current access to the first item, and determining the number of accesses to unique items with the label within the window of accesses.

14. The system of claim 13, wherein determining the number of accesses to unique items with the label within the window of accesses comprises estimating the number of accesses by sampling items within the window.

15. The system of claim 13, wherein adjusting the cache using the per-label stack distance histograms includes:
    selecting a plurality of possible cache allocations, and for each possible cache allocation, determining an overall miss rate for the possible cache allocation using the per-label stack distance histograms, each possible cache allocation being a division of cache storage according to a plurality of labels;

determining that a first cache allocation of the possible cache allocations has the lowest overall miss rate of the possible cache allocations; and adjusting the cache to the first allocation having the lowest overall miss rate.

16. The system of claim 15, wherein determining an overall miss rate for a possible cache allocation includes determining a miss rate for each label given the possible cache allocation using the per-label stack distance histograms.

17. The system of claim 16, wherein determining a miss rate for a label includes:

identifying an amount of space of cache storage allocated to the label; and using a per-label stack distance histogram for the label, determining the number of accesses to items having the label with a stack distance greater than or equal to the amount of space.

18. The system of claim 11, wherein adjusting the cache using the per-label stack distance histograms includes:

initializing a cache allocation of cache storage so that each label is not allocated any space in cache storage;

using the per-label stack distance histograms, determining a marginal miss rate decrease for allocating a given amount of space in cache storage to each of a plurality of labels; and determining a first label having the greatest marginal miss rate decrease and allocating the given amount of space to items having the first label.

19. The system of claim 18, further comprising incrementally allocating space using determined marginal miss rate decreases until all of the cache storage is allocated.

20. The system of claim 11, wherein the metadata associated with the item does not specify a cache allocation technique.

21. A computer storage medium encoded with a computer program, the program comprising instructions that when executed by one or more computers cause the one or more computers to perform operations comprising:

placing a plurality of items into a cache, each item having a label based on metadata associated with the item;

performing a number of accesses to respective items in the cache;

determining a per-label stack distance histogram for each label, including, for each label, determining a plurality of stack distances for accesses to items having the label; and adjusting the cache using the per-label stack distance histograms.

22. The computer storage medium of claim 21, wherein performing the accesses comprises:

receiving a request for a first item;

determining that the first item is not in the cache;

determining a first label for the first item using first metadata associated with the first item;

selecting a second item that is in the cache and has the first label; and replacing the second item with the first item.

23. The computer storage medium of claim 21, wherein determining a per-label stack distance histogram for a label includes, for a current access to a first item having the label, identifying a window of accesses between the current access to the first item and a most recent access to the first item prior to the current access to the first item, and determining the number of accesses to unique items with the label within the window of accesses.

24. The computer storage medium of claim 23, wherein determining the number of accesses to unique items with the label within the window of accesses comprises estimating the number of accesses by sampling items within the window.

25. The computer storage medium of claim 21, wherein adjusting the cache using the per-label stack distance histograms includes:

selecting a plurality of possible cache allocations, and for each possible cache allocation, determining an overall miss rate for the possible cache allocation using the per-label stack distance histograms, each possible cache allocation being a division of cache storage according to a plurality of labels;

determining that a first cache allocation of the possible cache allocations has the lowest overall miss rate of the possible cache allocations; and adjusting the cache to the first allocation having the lowest overall miss rate.

26. The computer storage medium of claim 25, wherein determining an overall miss rate for a possible cache allocation includes determining a miss rate for each label given the possible cache allocation using the per-label stack distance histograms.

27. The computer storage medium of claim 26, wherein determining a miss rate for a label includes:

identifying an amount of space of cache storage allocated to the label; and using a per-label stack distance histogram for the label, determining the number of accesses to items having the label with a stack distance greater than or equal to the amount of space.

28. The computer storage medium of claim 21, wherein adjusting the cache using the per-label stack distance histograms includes:

initializing a cache allocation of cache storage so that each label is not allocated any space in cache storage;

using the per-label stack distance histograms, determining a marginal miss rate decrease for allocating a given amount of space in cache storage to each of a plurality of labels; and determining a first label having the greatest marginal miss rate decrease and allocating the given amount of space to items having the first label.

29. The computer storage medium of claim 28, further comprising incrementally allocating space using determined marginal miss rate decreases until all of the cache storage is allocated.

30. The computer storage medium of claim 21, wherein the metadata associated with the item does not specify a cache allocation technique.

* * * * *